United States Patent [19]
Olmsted et al.

[11] Patent Number: 5,313,853
[45] Date of Patent: May 24, 1994

[54] FLAT SPRING BIASED SHIFTER

[75] Inventors: Bruce E. Olmsted; Stanley A. Tjapkes, both of Fruitport, Mich.

[73] Assignee: Grand Haven Stamped Products Company, Div. of JSJ Corporation, Grand Haven, Mich.

[21] Appl. No.: 992,243

[22] Filed: Dec. 14, 1992

[51] Int. Cl.$^5$ ............... F16H 59/04; G05G 9/053
[52] U.S. Cl. .............. 74/473 P; 74/471 XY; 267/150; 267/162
[58] Field of Search .......... 74/471 XY, 473 R, 473 P; 200/6 A; 267/150, 161, 162; 273/148 B

[56] References Cited
U.S. PATENT DOCUMENTS

| | | | |
|---|---|---|---|
| 2,100,642 | 11/1937 | Geyer | 74/473 P |
| 3,483,888 | 12/1969 | Wurzel | 137/539 |
| 3,811,018 | 5/1974 | Kaplan | 200/6 A |
| 4,269,081 | 5/1981 | Peterson et al. | 74/473 R |
| 4,333,360 | 8/1982 | Simmons | 74/473 P |
| 4,569,245 | 2/1986 | Feldt et al. | 74/473 P |
| 4,784,008 | 11/1988 | Paquereau et al. | 200/6 AX |

*Primary Examiner*—Allan D. Herrmann
*Attorney, Agent, or Firm*—Price, Heneveld, Cooper, DeWitt & Litton

[57] ABSTRACT

A drop-in type shifter is provided for an automotive transmission, the shifter employing one or more washer-like flat springs for spring biasing a shift stick to a predetermined position on the shifter and actuatable for changing the drive ratio of the transmission when the shift stick is pivoted. A base is adapted for mounting the shifter on the transmission. A spherical socket is disposed on the base, and a spherical ball is disposed on the shift stick, the shift stick being received in the ball for pivotally mounting the shift stick on the base. One or more flat washer-like springs are provided having an aperture through which the upper end of the shift stick extends, the washer-like spring being normally planar in an unstressed condition but being compressible into a curvilinear predetermined cross-sectional shape as installed. A rocking shaft on the shift stick includes opposing ends engaging the washer-like springs to resiliently flex the washer-like springs into an increasing curvilinear cross-sectional shape as the shift stick is moved away from a predetermined neutral position so as to spring bias the shift stick to return to the predetermined position.

36 Claims, 5 Drawing Sheets

FLAT SPRING BIASED SHIFTER

BACKGROUND OF THE INVENTION

The present invention relates generally to shifters for automotive transmissions and, more particularly, is directed to a drop-in type automotive transmission shifter which is spring biased into the neutral position with one or more flat springs.

Drop-in type shifters are well-known in the prior art. These shifters normally comprise a shift stick means for pivotally mounting the shift stick about a base, and a gear actuating lever which extends into the transmission for changing the drive ratio of the transmission when the shift stick is manually pivoted. Often the means for pivotally mounting the shift stick comprises a ball and socket connection. The shifter is normally secured to the top of a transmission with bolts entering through the base of the shifter. The base is usually bolted over an aperture in the top of the transmission and the shift lever extends downwardly from the base through the aperture into the transmission. Hence, these types of shifters have been referred to as drop-in type shifters.

It has often been considered desirable to spring bias an automotive transmission shifter into a neutral position or neutral plane. In the case of a conventional manual automotive transmission having a H-shaped shift pattern implemented with a shift stick which is pivotable about first and second orthogonal axes, it has also been thought to be desirable to provide a differential spring bias which may, for example, be used to inhibit positioning the shifter in one or more gear positions such as the reverse gear position.

One such shifter is disclosed in U.S. Pat. No. 4,569,245 to Feldt et al. In U.S. Pat. No. 4,569,245 several pivotable drop-in shifters are disclosed, each having one or more washer-like springs for biasing a shift lever into a neutral position. The washer-like springs are preformed into a free-state bowed or bent condition and then placed in a compressed condition in the shifter in a manner such that a rocking shaft extended through the shifter stick engages the washer-like springs to bias the shifter stick to the neutral position. In particular, the washer-like springs are compressed between the rocking shaft and a housing plate so that the washer-like springs engage the ends of the rocking shaft to bias the rocking shaft and thus the shifter stick moves towards the neutral position. Consistent shape is important to this arrangement so that the springs give a predictable biasing force. However, spring steel is difficult to preform into a consistent shape due to the spring steel's natural resiliency and its tendency not to predictably permanently deform. Further, the lack of consistent shape tends to make use of multiple stacked or interleaved springs less desirable since the inconsistent shape tends to cause non-uniform and unpredictable biasing forces. Also, when installed the shaped spring requires an accurate placement of the springs within the housing to provide the proper orientation necessary to provide the predictable biasing force. Accordingly, inefficiencies during assembly are caused in addition to the possibilities of inaccurate biasing forces being created.

Thus, an improved shifter solving the aforementioned problems is desired.

SUMMARY OF THE INVENTION

A drop-in type shifter for an automotive transmission is provided which employs one or more washer-like flat springs for spring biasing a shift stick to a predetermined position on the shifter. The shift stick is pivotally mounted to the shifter, and includes an upper end which is manually actuatable and a lower end which is provided with a lever adapted for insertion into an automotive transmission for changing the drive ratio of the transmission when the shift stick is pivoted. A base is provided which is adapted for mounting the shifter to the transmission. A spherical socket is disposed on one of the base and the shift stick, and a spherical ball section is disposed on the other of the base and the shift stick, the lever being received in one of the ball section and socket for pivotally mounting the shift stick on the base. At least one washer-like flat spring is provided having an aperture therein through which the upper end of the shift stick extends, the washer-like spring being normally planar in an unstressed condition but being compressible into a curvilinear cross-sectional shape. Means associated with the shift stick are provided for engaging the washer-like spring to resiliently flex the washer-like spring into the curvilinear cross-sectional shape when assembled. Thus, when the shift stick is moved from a predetermined position, the Washer-like spring biases the shift stick to return to the predetermined position.

In a narrower aspect, the shifter includes means for pretensioning the washer-like spring into a first curvilinear cross-sectional shape as installed when the shift stick is in the predetermined position, the washer-like spring being resiliently flexible into a second curvilinear cross-sectional shape of greater curvature when the shift stick is moved from the predetermined position to resiliently urge the shift stick to return to the predetermined position.

The preferred embodiment of the present invention offers several advantages over known prior art shifters. The flat planar washer-like springs are relatively easily made, and do not require deforming the spring into a bowed or pre-bent shape. Further, since the flat planar washer-like springs do not require deforming, their durability is increased since stress-risers caused by a bending or preforming process are avoided. Also, the springs are symmetrical and planar and thus do not need to be placed into any particular orientation for assembly, thus simplifying assembly. Still further, the shifter is comprised of a minimum of parts that are can be readily assembled, and which cooperate to give a reliable and consistent shift stick biasing force. Also, the springs are pretensioned during assembly so that the shift stick is not loosely positioned, and also so that the assembly does not tend to rattle. Further, the components are design flexible so that different spring biasing forces can be easily achieved, such as by using multiple springs, by using springs made of different materials, or by using alternative springs having different thicknesses and/or spring rates. Also, the fulcrum of the spring can be moved to achieve a differential bias.

These and other features, advantages and objects of the present invention will be further understood and appreciated by those skilled in the art by reference to the following specification, claims and appended drawings.

DETAILED DESCRIPTION OF THE PREFERRED EMBODIMENT

A drop-in type shifter 10 (FIGS. 1–3) embodying the present invention is provided for an automotive transmission 11. Shifter 10 employs one or more washer-like circularly-shaped flat springs 12 for spring biasing a shift stick 14 to a predetermined neutral position on the shifter 10. Springs 12 are characterized by being substantially planar when in an unstressed or free-state condition, thus being easier to manufacture than springs of known prior art which require at least an additional manufacturing step of bending or deforming, such as those described in U.S. Pat. No. 4,569,245. The planar shape of springs 12 facilitates close dimensional control and therefore ultimately allows a more consistent assembly having a more consistent and predictable spring biasing force.

It is noted that several of the shifter components described hereinafter are related to those described in U.S. Pat. No. 4,569,245 issued Feb. 11, 1986, entitled DROP-IN TYPE AUTOMOTIVE TRANSMISSION SHIFTER, the entire contents of which is hereby incorporated by reference. Thus, discussion of previously known components is minimized hereinafter except as required for a complete understanding of the present invention.

Figure 1:
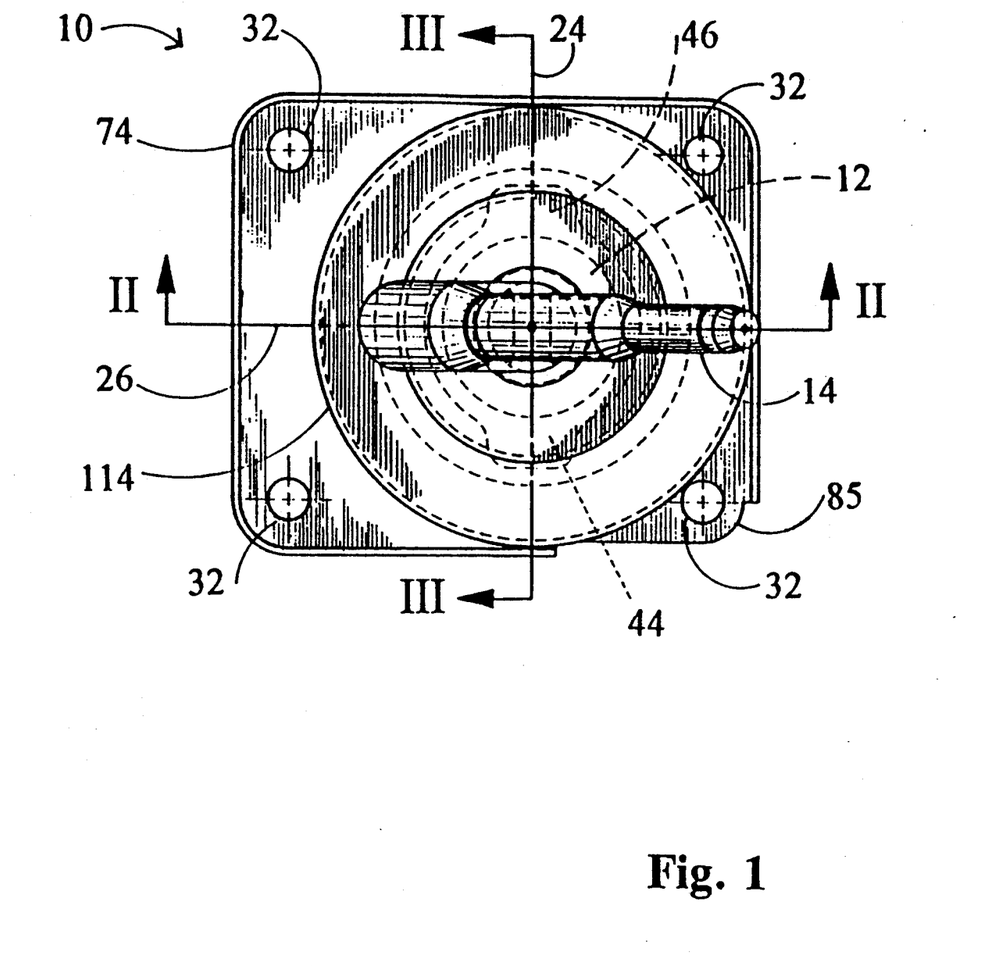
FIG. 1 is a top plan view of a drop-in shifter embodying the present invention.
Figure 2:
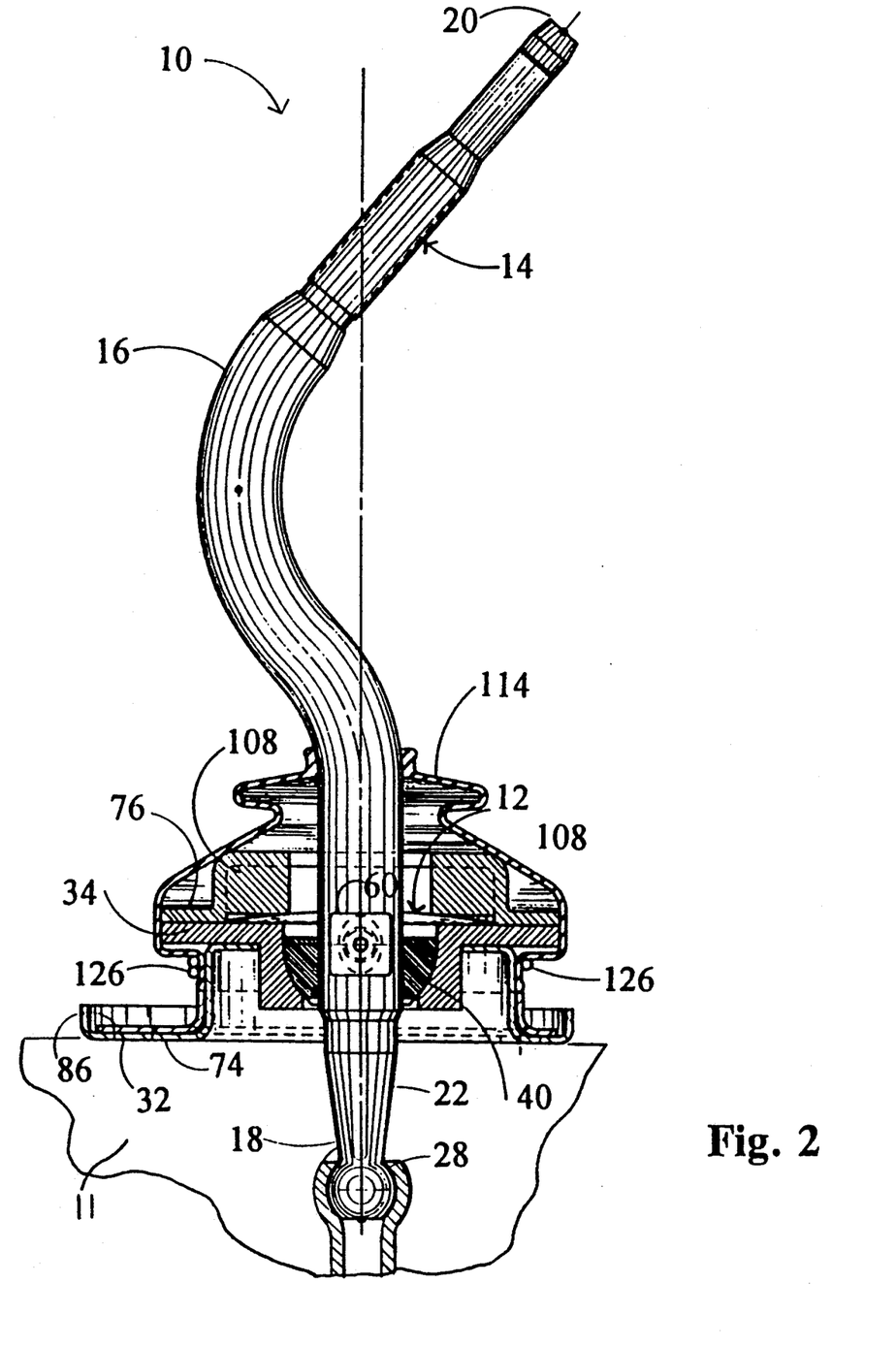
FIG. 2 is a cross-sectional view of the drop-in shifter taken along the plane II—II in FIG. 1.
Figure 4:
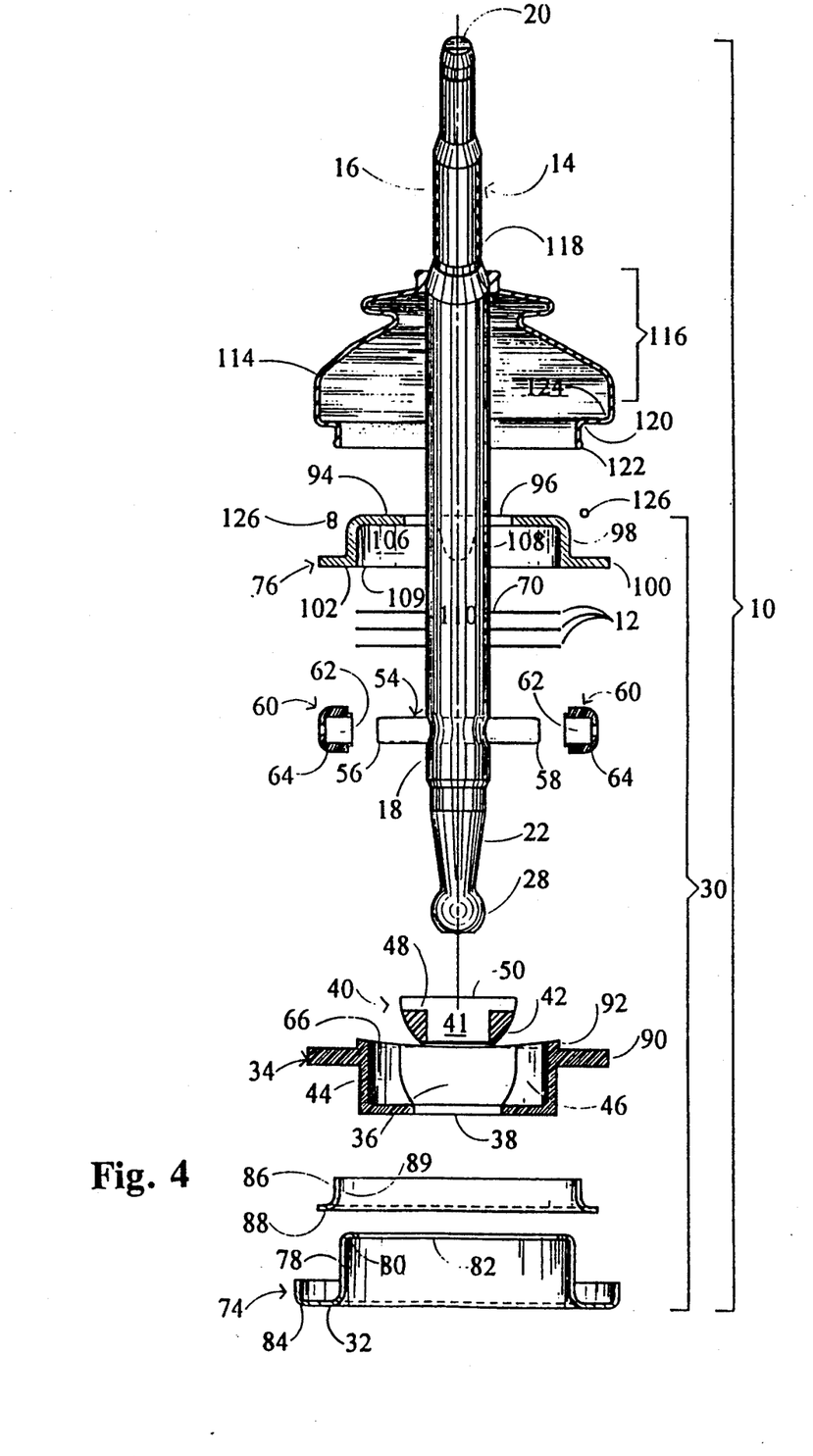
FIG. 4 is an exploded side view of the drop-in shifter as shown in FIG. 3.

With specific reference to FIG. 4, shifter 10 includes the elongate, pivotable shift stick 14, stick 14 having an upper end 16 and a lower end 18. Upper end 16 is adapted for receiving a handle (not shown) attachable to the upper tip 20 of upper end 16, the handle being adapted to facilitate grasping and manual actuation of the shift stick 14. The lower end 18 of shift stick 14 comprises a lever 22 which is adapted for insertion into an automotive transmission for changing the drive ratio of the transmission when the shift stick 14 is pivoted. The manner in which the lever 14 changes the drive ratio of the transmission is conventional and is not described herein. It need only be understood that pivoting of the shift lever 14 about first and second orthogonal axes 24 and 26 (FIG. 1) in the conventional 4-speed, 5-speed or 6-speed patterns as known in the art creates a pattern of movement for a ball-shaped tip 28 disposed on the lower end of the shift lever 22, which tip 28 actuates appropriate linkage disposed within the transmission for changing its drive ratio. In FIG. 1 as shown, axis 24 is normally oriented from side to side in a vehicle, and axis 26 is oriented from front to rear in the vehicle.

A base subassembly 30 (FIG. 4) is provided which is adapted for mounting the shifter 10 on an automotive transmission, the transmission not being illustrated herein. The base subassembly 30 may, for example, be connected to the transmission with a plurality of bolts which extend through the apertures 32 in base subassembly 30 into the transmission (FIG. 1). Base subassembly 30 (FIG. 4) includes a socket forming insert 34 which is made from polymeric material or the like, and defines an upwardly facing semi-spherically socket 36. The socket 36 is provided with an aperture 38 centrally disposed on the bottom thereof. A semi-spherical ball section 40 is mounted on shift stick 14, ball section 40 including an aperture 41 for receiving shift stick 14 and further including a lower spherically-shaped surface 42 sized to be operably received in socket 36. Shift stick 14 extends through the aperture 38 disposed in the bottom of socket 36 and into the transmission for actuating appropriate shift linkage within the transmission for changing the drive ratio of the transmission when the shift stick is pivoted.

Insert 34 further includes opposing slot-like pockets or channels 44 and 46 which extend from spherical socket 36 into the body of insert 34, slot-like pockets 44 and 46 being oriented transversely to the longitudinal direction defined by shift stick 14. Also, a channel or depression 48 is formed in an upper flat surface 50 on ball section 40, channel 48 being positionable so that it aligns with pockets 44 and 46. A rocking shaft 54 is slideably secured perpendicularly through shift stick 14, rocking shaft 54 having first and second ends 56 and 58 which extend from opposing sides of the shift stick 14 and mateably rest in channel 48. Rocking shaft ends 56 and 58 further extend outwardly of channel 48 into the openings 62 of bushings 60 in which they are rotatably mounted. Bushings 60 include rectanguarly-shaped outer surfaces 64 sized to slideably fit into and engage pockets 44 and 46. The sliding fit of bushings 60 stabilizes the shift stick 14 as it is pivotable moved about the first and second orthogonal axes 24 and 26.

Socket forming insert 34 includes an arcuately cylindrically-shaped upper surface 66 for receiving springs 12. In particular, upper surface 66 has an arcuate constant cross-sectional shape when viewed in the direction of orthogonal axis 26, and further is defined by linear segments that extend parallel to axis 26. (See FIGS. 3 and 4.) Notably, rocking shaft 54 extends in the direction of orthogonal axis 24, so that it has a particular orientation to the arcuate curvilinear shape of upper surface 66.

At least one, and preferably a plurality of normally planar washer-like springs 12 are provided, each having an aperture 70 centrally located therein through which the upper end 16 of shift stick 14 extends. The washer-like springs 12, preferably 3 or 4 in number are normally planar in an unstressed or free-state condition (FIG. 4), but are compressible into the curvilinear cross-sectional shape of arcuate upper surface 66 of insert 34 (FIG. 3) as discussed below. It is contemplated that the thickness of the spring 12 will be between 0.010 and 0.040 inches, and more preferably between about 0.014 and 0.28 inches, and that springs will be constructed of spring steel, although it is contemplated that various materials including polymeric materials could be used. Notably, by varying the thickness and/or resiliency of springs 12, a variety of selectable biasing forces can be achieved on shift stick 14. Springs 12 are also symmetrically circularly-shaped so that springs 12 need not be oriented to a particular side or to a particular angle when inserting the springs 12 into insert 34 of base subassembly 30. In FIG. 4, three of springs 12 are shown.

Base subassembly 30 (FIG. 4) also comprises a lower sheet metal mounting plate 74 and an upper plastic cover 76 which are riveted together, and which sandwich together to securely retain springs 12, rocking shaft 54, ball section 40, and insert 34 together. Notably, cover 76 could also be stamped. Specifically, lower mounting plate 74 includes a cylindrically-shaped sidewall 78 with a planar inwardly extending upper flange 80 defining an aperture 82, and a lower outwardly extending flange 84 with the multiple apertures 32 therein for securing base subassembly 30 to the vehicle transmission. An optional cylindrically-shaped reinforcement ring 86 is adapted to mateably fit around sidewall 78 on mounting plate 74 to reinforce same, reinforcement ring 86 including a lower flange 88 adapted to abuttingly engage lower flange 84 on lower mounting plate 74 and a sidewall 89 adapted to reinforce sidewall 78 of mounting plate 74. It is contemplated that reinforcement ring 86 will only be necessary where outwardly extending flange 84 is discontinuous, such as the flange 84 shown which includes a notched corner 85 for clearance to adjacent vehicle body parts. Notably, it is also contemplated that at least components 34, 74 and 86 could be made into a one-piece molding, which molding could be made of plastic or powered metal.

The body of socket forming insert 34 is adapted to mateably slide partially into aperture 82 and includes side flanges 90 that engage the top surface of upper flange 80 on lower mounting plate 74, side flanges 90 extending outwardly of lower mounting plate sidewall 78. Side flanges 90 are located proximate to but a distance below insert upper surface 66 at least in several places so as to form a lip 92.

Cover or upper plate 76 is cup-shaped and includes a planar wall 94 with an aperture 96 therein for receiving shift stick 14. A cylindrically-shaped sidewall 98 extends downwardly from the outer edges of planar wall 94 and is being reinforcingly supported by an outwardly extending lower attachment flange 100. The inner corner 102 defined by sidewall 98 and flange 100 fits around lip 92 with flange 100 resting on insert side flanges 90. Cover 76 is attached to insert 34 by riveting or otherwise securing flanges 90 and 100 together, such as by use of rivets 104.

Cover sidewall 98 defines a cavity 106 of sufficient diameter to closely receive springs 12 to locate springs 12, but so that springs 12 can be flexed into cavity 106 as described below. Extending downwardly from cover planar wall 94 is a blunt ridge or protrusion 108, the ridge also extending laterally in the direction of axis 26 centrally across cover 76 but with aperture 96 dividing ridge 108 into two opposing sections. Notably, ridge 108 extends downwardly a distance short of the lower surface 109 of cover lower flange 100. However, the tip 110 of ridge 108 protrudes downwardly with sufficient length such that when springs 12 are placed on insert upper surface 66 in cavity 106 and clamped between insert upper surface 66 and ridge 108, ridge 108 resiliently bends springs 12 into an arcuate shape corresponding substantially to arcuate upper surface 66 of insert 34. Also as assembled onto rocking shaft ends 56 and 58, bushings 60 contact the lowermost side of the lowermost spring 12 for the reasons hereinafter noted. Cover sidewall 98 and cover planar wall 94 form cavity 106 which is large enough so that portions of springs 12 can flex upwardly into cavity 106. Notably, cover planar wall 94 can act as a stop or limit to the flexing of springs 12 if cover sidewall 98 is short enough, or alternatively stops (see FIG. 5) can be added to the inside of cover sidewall 98 to limit the flexing of springs 12.

A protective boot 114 includes an upper flexible portion 116 with an aperture 118 therein adapted to closely engage shift stick 14. Boot 114 further includes a lower inwardly flanged portion 120 with a downwardly extending lip 122. Inwardly flanged portion 120 forms a concave surface 124 adapted to stretch around and interlock with outwardly extending insert flange 90. An optional spring steel wire clip 126 in the shape of a loop is adapted to be resiliently flexed and released onto lip 122 to secure boot lower portion 120 in place on shifter 10.

OPERATION

Figure 3:
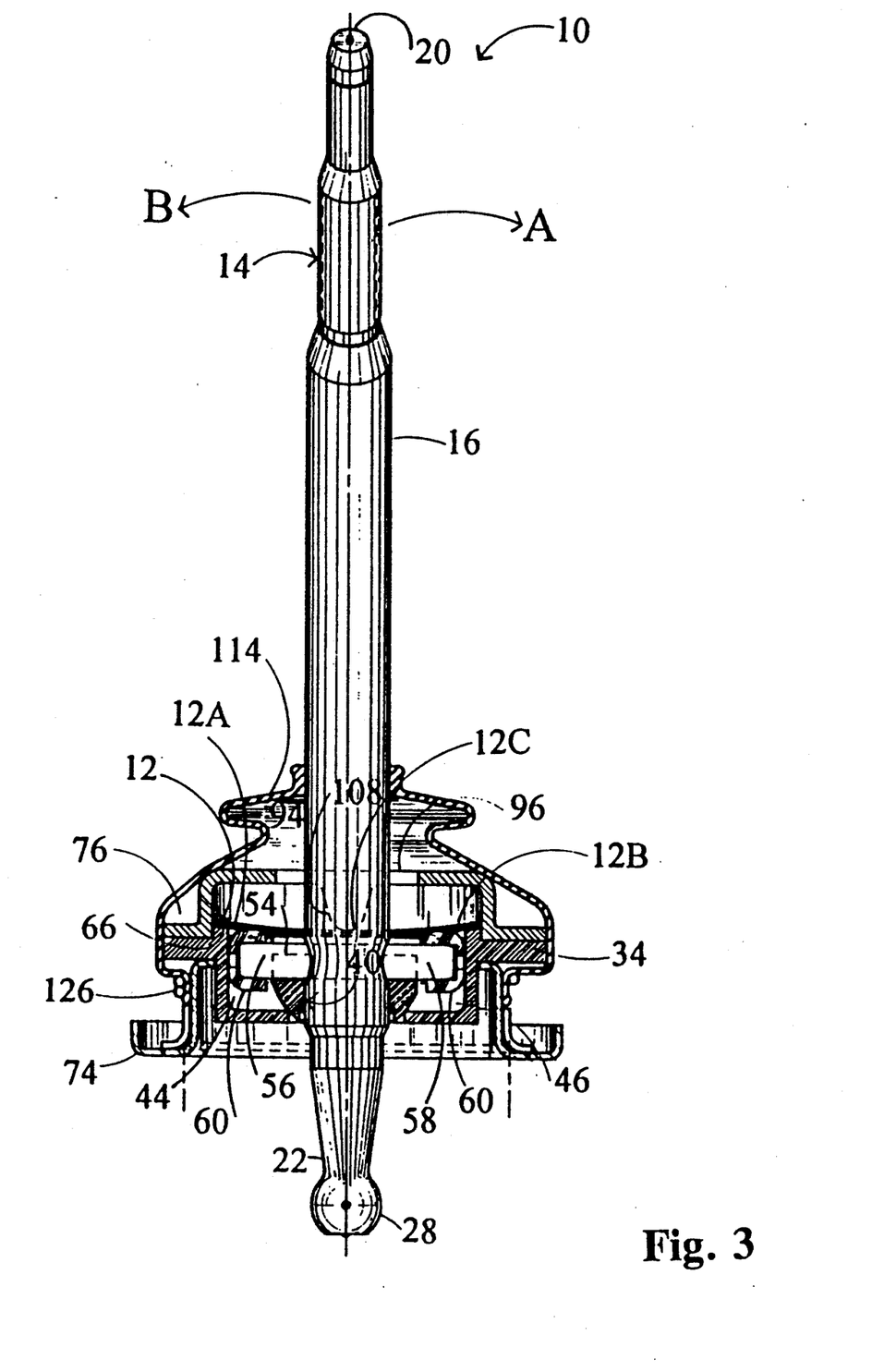
FIG. 3 is a cross-sectional view of the drop-in shifter taken along the plane III—III in FIG. 1.

As assembled as described above, springs 12 are forced into a bowed condition. For ease of description, the upwardly flexed portions of spring 12 are hereinafter referred to as wing portions or halves 12A and 12B (FIG. 3), and the central portion is referred to as 12C. In the flexed condition, central portion 12C presses upwardly against ridge 108, and wing portion 12A and 12B press downwardly against bushings 60 on rocking shaft ends 56 and 58, wing portions 12A and 12B also pressing against arcuate upper surface 66 on insert 34. The force of spring wings portions 12A and 12B force rocking shaft 54 to a neutral position (as shown in FIG. 3), and in turn force shift stick 14 which is rigidly connected to rocking shaft 54 to an erect upright predetermined neutral position. As shift stick 14 is pivoted on ball section 40 and socket 36 in the direction of axis 24 such as in the direction A or B, one of rocking shaft ends 56 and 58 presses upwardly against bushings 60 against the corresponding wing portion 12A or 12B, respectively, while the other rocking shaft end is pulled away from the spring, thus causing the spring 12 to apply an unbalanced biasing force to drive shift stick 14 back to the predetermined neutral position. The pivoting movement of shift stick 14 can be limited in a number of different ways, such as by limiting the movement of lever 22 in the transmission to which it is connected by limiting the movement of shift stick upper end 16 by abutting shift stick upper end 16 into the marginal edges of aperture 96 in cover 76, or by abutting spring halves 12A and/or 12B into the underside of cover planar wall 94 (or into stops on cover sidewalls 98).

MODIFICATION

Figure 5:
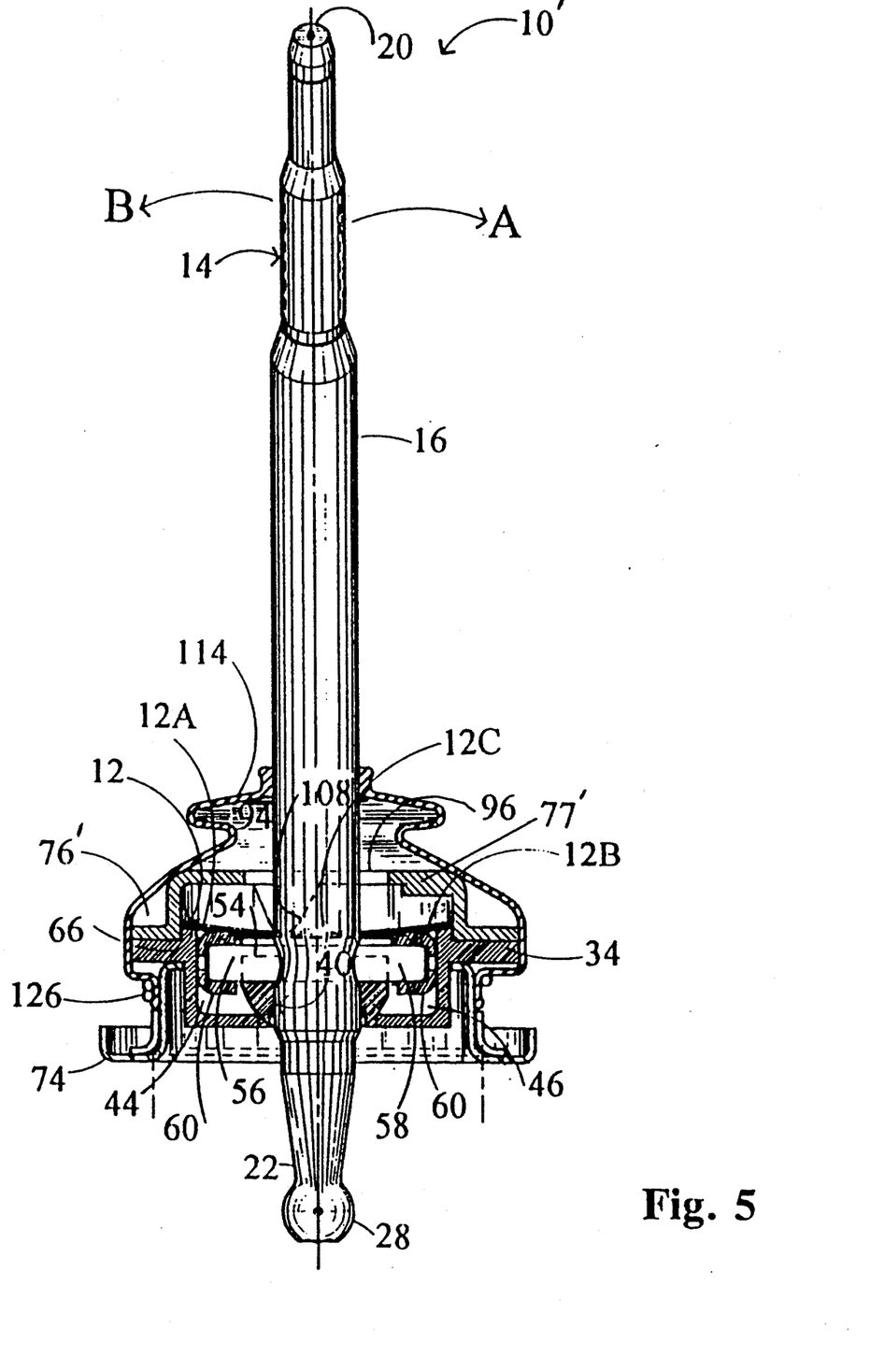
FIG. 5 is a cross-sectional view of a modified drop-in shifter embodying the present invention, the view being comparable to FIG. 3.

A modified shifter 10' embodying the present invention is shown in FIG. 5. Modified shifter 10' includes substantially identical parts to shifter 10 with the exception of a modified cover 76'. Modified cover 76' is comparable to cover 76, but in modified cover 76', protrusion 108' is located offset from fore-to-aft axis 26. This causes springs 12 to yield a differential bias as shift stick 14 is biased to either side of axis 26 due to the non-centered fulcrum or line of deflection defined by protrusion 108' on springs 12. Specifically as viewed in FIG. 5, protrusion 108' provides springs 12 with a greater moment arm to the right on rocking shaft end 58 than to the left on rocking shaft end 56. Thus, as shift stick upper end 16 is pivoted to the left and rocking shaft end 58 is lifted against and flexes springs 12, springs 12 generate a lower amount of centering biasing force. Alternatively, as shift stick upper end 16 is pivoted to the right and rocking shaft end 56 is lifted against a higher amount of centering biasing force. Also, on modified cover 76' is shown a stop 77' which limits the pivotal movement of springs 12 (on the right side), and which in turn limits the upward movement of rocking shaft end 58 and the left-ward movement of shift stick upper end 16.

Thus, there is provided a shifter and modified shifter which utilize and modified shifter one or more symmetrical planar springs to improve assembly and lower manufacturing costs, the shifter pretensioning the springs into a curvilinear shape that provides a uniform and reliable biasing force for biasing a shift stick to a predetermined neutral position.

In the foregoing description, it will be readily appreciated by those skilled in the art that modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows:

1. A shifter for an automotive transmission comprising:
   an elongated, pivotable shift stick having an upper end and a lower end, said upper end being manually actuatable and said lower end having means for changing the drive ratio of the transmission when said shift stick is pivoted;
   a base for mounting said shifter on the transmission;
   means for pivotally mounting said shift stick on said base for movement about first and second axes orthogonal to each other;
   at least one washer-like spring having an aperture therein through which said lower end of said shift stick extends, said at least one washer-like spring being normally planar in an unstressed condition but being resiliently compressible into a curvilinear cross-sectional shape;
   retainer means for retaining said at least one washer-like spring on said base;
   means for compressing said at least one washer-like spring along said first axis into said curvilinear cross-sectional shape; and
   means associated with said shift stick for engaging said at least one washer-like spring along said second axis orthogonal to said first axis to resiliently flex said at least one washer-like spring about said first axis as said shift stick is moved from a predetermined position thus causing said at least one washer-like spring to spring bias said shift stick to return to the predetermined position.

2. A shifter as defined in claim 1 wherein said means for retaining includes said means for compressing said at least one washer-like spring into the curvilinear cross-sectional shape.

3. A shifter as defined in claim 1 wherein said means for compressing includes a first and a second tensioning member, said first tensioning member engaging said at least one washer-like spring along said first axis to bisect said at least one washer-like spring into halves, said second tensioning member engaging each of said at least one washer-like spring halves in a direction in opposition to said first tensioning member at positions spaced from said first axis, said first and second tensioning members pretensioning said at least one washer-like spring by forming said at least one washer-like spring into a bowed condition having a generally constant cross-sectional shape in the direction of said first axis.

4. A shifter as defined in claim 1 including a plurality of said at least one washer-like spring.

5. A shifter as defined in claim 1 wherein said means for pivotally mounting includes a spherical socket disposed on said base, and a ball section disposed on said shift stick operably engaging said spherical socket.

6. A shifter as defined in claim 1 wherein said at least one washer-like spring has a circular disk-like shape.

7. A shifter as defined in claim 1 wherein one of said means for retaining and said means for engaging defines an off-center line of deflection on said at least one washer-like spring so that said at least one washer-like spring provides a differential biasing force on said shift stick when said shift stick is moved about said first axis.

8. A shifter as defined in claim 1 wherein said at least one washer-like spring is divided into opposing portions by said means for compressing, and wherein said means for engaging said at least one washer-like spring includes a rocking shaft secured to said shift stick, said rocking shaft including ends lying proximate said opposing portions on opposing sides of said first axis, said rocking shaft being adapted to engage said opposing portions as said shift stick is moved from said predetermined position in a direction away from said first axis.

9. A shifter as defined in claim 1 wherein said means for compressing includes a curvilinear surface on said base that mateably receives said at least one washer-like spring, said curvilinear surface being substantially in the shape of said at least one washer-like spring when said at least one washer-like spring is in said curvilinear cross-sectional shape, and further includes a cover mounted on said base, said cover including a protruding ridge adapted to press said at least one washer-like spring to said curvilinear cross-sectional shape against said curvilinear surface.

10. A shifter as defined in claim 9 wherein said means for engaging includes a rocking shaft having ends secured to said shift stick, and wherein said base includes channels for slideably receiving said ends of said rocking shaft, said rocking shaft ends extending into said channel for stabilizing said pivotable shift stick for pivotable movement about said first and second orthogonal axes.

11. A shifter as defined in claim 10 wherein said rocking shaft includes bushings positioned on the ends of said rocking shaft.

12. A shifter as defined in claim 1 wherein said base includes an insert, said insert forming a spherical socket and further including a curvilinear surface for receiving said at least one washer-like spring, said base further includes a cover attached to said insert, said cover including a protruding member pressing said at least one washer-like spring against said curvilinear surface to pretension said at least one washer-like spring.

13. A shifter as defined in claim 12 wherein said curvilinear surface is arcuately shaped when viewed in a first direction and is comprised of a plurality of linear segments extending parallel to said first direction.

14. A shifter as defined in claim 13 wherein said means for engaging said at least one washer-like spring includes a rocking shaft secured to said shift stick in a direction perpendicular to said first direction, said rocking shaft including ends positioned to engage said at least one washer-like spring and press portions of said at least one washer-like spring away from said curvilinear surface as said shift stick is moved from the predetermined position in a direction perpendicular to said first direction, whereby, if said shift stick is moved from said predetermined position in a direction perpendicular to said first direction, said at least one washer-like spring is resiliently compressed to a bowed condition by interaction of said curvilinear surface with said protruding member on said cover and one of said rocking shaft ends, and thus said shift stick is biased to return back to said predetermined position.

15. A shifter as defined in claim 1 wherein said base includes an insert including a curvilinear surface for receiving said at least one washer-like spring, said curvilinear surface defining a plurality of generally linear parallel segments.

16. A shifter as defined in claim 15 wherein said base includes a molded cover attached to said insert, said cover including a protruding member pressing said at least one washer-like spring against said curvilinear surface to pretension said at least one washer like spring.

17. A shifter as defined in claim 16 wherein said cover includes a stop for limiting the degree to which said at least one washer-like spring can be flexed.

18. A shifter as defined in claim 1 wherein said at least one washer-like spring defines a plurality of linear segments extending parallel said first axis when in said curvilinear cross-sectional shape.

19. A shifter for an automotive transmission comprising:
an elongate, pivotable shift stick having an upper end and a lower end, said upper end being manually actuatable and said lower end having means for changing the drive ratio of the transmission when said shift stick is pivoted;
a base for mounting said shifter on the transmission;
a spherical socket disposed on one of said base and said shift stick;
a spherical ball section disposed on the other of said base and said shift stick, said ball section being received in said socket for pivotally mounting said shift stick on said base;
at least one washer-like spring having an aperture therein through which said lower end of said shift stick extends, said at least one washer-like spring being normally planar in an unstressed condition but being resiliently compressible into a curvilinear cross-sectional shape;
means for retaining said at least one washer-like spring on said base;
means associated with said shift stick for engaging said at least one washer-like spring to resiliently flex said at least one washer-like spring as said shift stick is moved from a predetermined position thus causing said at least one washer-like spring to spring bias said shift stick to return to the predetermined position;
said means for retaining including means for pretensioning said at least one washer-like spring into a pretensioned but stable curvilinear cross-sectional shape when said shift stick is in said predetermined position;
said means for pretensioning including a first and a second tensioning member, said first tensioning member engaging said at least one washer-like spring along an axis bisecting said at least one washer-like spring into halves, said second tensioning member engaging each of said at least one washer-like spring halves in a direction in opposition to said first tensioning member, said first and second tensioning members pretensioning said at least one washer-like spring by forming said at least one washer-like spring into a bowed condition in said curvilinear cross-sectional shape; and
said means for engaging said at least one washer-like spring including a rocking shaft secured to said shift stick, said rocking shaft including ends lying on opposing sides of said axis, said rocking shaft being adapted to individually engage one or the other of said at least one washer-like spring halves as said shift stick is moved from said predetermined position in a direction away from said axis.

20. A shifter as defined in claim 19 wherein said second tensioning member includes a curvilinear surface on said base that mateably receives said at least one washer-like spring, said curvilinear surface being substantially in the shape of said at least one washer-like spring when said at least one washer-like spring is in said pretensioned curvilinear cross-sectional shape, and said second tension member is a cover mounted on said base, said cover including a protruding ridge adapted to press said at least one washer-like spring to said pretensioned shape against said curvilinear surface.

21. A shifter as defined in claim 20 wherein said means for engaging includes bushings positioned on the ends of said rocking shaft.

22. A shifter as defined in claim 21 wherein said base includes channels extending from said socket for slideably receiving said bushings, said bushings and rocking shaft ends extending into said channel for stabilizing said pivotable shift stick for pivotable movement about first and second orthogonal axes.

23. A shifter for an automotive transmission comprising:
an elongate, pivotable shift stick having an upper end and a lower end, said upper end being manually actuatable and said lower end having means for changing the drive ratio of the transmission when said shift stick is pivoted;
a base for mounting said shifter on the transmission;
a spherical socket disposed on one of said base and said shift stick;
a spherical ball section disposed on the other of said base and said shift stick, said ball section being received in said socket for pivotally mounting said shift stick on said base;
at least one washer-like spring having an aperture therein through which said lower end of said shift stick extends, said at least one washer-like spring being normally planar in an unstressed condition but being resiliently compressible into a curvilinear cross-sectional shape;
means for retaining said at least one washer-like spring on said base;
means associated with said shift stick for engaging said at least one washer-like spring to resiliently flex said at least one washer-like spring as said shift stick is moved from a predetermined position thus causing said at least one washer-like spring to spring bias said shift stick to return to the predetermined position;
said spherical socket is disposed on said base, and said ball section being disposed on said shift stick; and
said means for engaging said at least one washer-like spring including a rocking shaft secured to said shift stick, and said ball section includes a channel for receiving said rocking shaft.

24. A shifter as defined in claim 23 wherein said base includes a pair of opposing slots for slideably receiving said ends of said rocking shaft, said slots holding said shift stick in a given orientation relative to said base.

25. A shifter for an automotive transmission comprising:

en elongate, pivotable shift stick having an upper end and a lower end, said upper end being manually actuatable and said lower end having means for changing the drive ratio of the transmission when said shift stick is pivoted;

a base for mounting said shifter on the transmission;

a spherical socket disposed on one of said base and said shift stick;

a spherical ball section disposed on the other of said base and said shift stick, said ball section being received in said socket for pivotally mounting said shift stick on said base;

at least one washer-like spring having an aperture therein through which said lower end of said shift stick extends, said at least one washer-like spring being normally planar in an unstressed condition but being resiliently compressible into a curvilinear cross-sectional shape;

means for retaining said at least one washer-like spring on said base;

means associated with said shift stick for engaging said at least one washer-like spring to resiliently flex said at least one washer-like spring as said shift stick is moved from a predetermined position thus causing said at least one washer-like spring to spring bias said shift stick to return to the predetermined position; and said base including an insert, said insert forming said spherical socket and further including a curvilinear surface for receiving said at least one washer-like spring, said base further includes a cover attached to said insert, said cover including a protruding member pressing said at least one washer-like spring against said curvilinear surface to pretension said at least one washer-like spring.

26. A shifter as defined in claim 25 wherein said curvilinear surface is arcuately shaped when viewed in a first direction and is comprised of a plurality of linear segments extending parallel to said first direction.

27. A shifter as defined in claim 26 wherein said means for engaging said at least one washer-like spring includes a rocking shaft secured to said shift stick in a direction perpendicular to said first direction, said rocking shaft including ends positioned to engage said at least one washer-like spring and press portions of said at least one washer-like spring away rom said curvilinear surface as said shift stick is moved from the predetermined position in a direction perpendicular to said first direction, whereby, if said shift stick is moved from said predetermined position in a direction perpendicular to said first direction, said at least one washer-like spring is resiliently compressed to a bowed condition by interaction of said curvilinear surface with said protruding member on said cover and one of said rocking shaft ends, and thus said shift stick is biased to return back to said predetermined position.

28. A shifter for an automotive transmission comprising:

an elongate, pivotable shift stick having an upper nd and a lower end, said upper end being manually actuatable and said lower end having means for changing the drive ratio of the transmission when said shift stick is pivoted;

a base for mounting said shifter on the transmission;

a spherical socket disposed on one of said base and said shift stick;

a spherical ball section disposed on the other of said base and said shift stick, said ball section being received in said socket for pivotally mounting said shift stick on said base;

at least one washer-like spring having an aperture therein through which said lower end of said shift stick extends, said at least one washer-like spring being normally planar in an unstressed condition but being resiliently compressible into a curvilinear cross-sectional shape;

means for retaining said at least one washer-like spring on said base;

means associated with said shift stick for engaging said at least one washer-like spring to resiliently flex said at least one washer-like spring as said shift stick is moved from a predetermined position thus causing said at least one washer-like spring to spring bias said shift stick to return to the predetermined position; and said base including a molded insert, said insert forming said spherical socket and further including a curvilinear surface for receiving said at least one washer-like spring.

29. A shifter as defined in claim 28 wherein said base includes a molded cover attached to said insert, said cover including a protruding member pressing said at least one washer-like spring against said curvilinear surface to pretension said at least one washer-like spring.

30. A shifter as defined in claim 29 wherein said cover includes a stop for limiting the degree to which said at least one washer-like spring can be flexed.

31. A drop-in shifter for an automotive transmission comprising:

an elongated, pivotable shift stick having an upper end and a lower end, said upper end being manually actuatable and said lower end having a lever adapted for insertion in an automotive transmission for changing the drive ratio of the transmission when said shift stick is pivoted;

a base adapted for mounting said shifter on the transmission;

means for pivotally mounting said shift stick on said base for movement about first and second axes orthogonal to each other, said means including a channel;

a rocking shaft disposed on said shift stick having first and second ends extending from said shift stick, said first and second ends extending into said channel for stabilizing said pivotable shift stick for pivotal movement about said first and second orthogonal axes;

at least one washer-like spring having an aperture therein through which said lower end of said shift stick extends, said at least one washer-like spring being normally planar when in an unstressed condition but being compressible into a pretensioned curvilinear cross-sectional shape along said first axis;

means for retaining said at least one washer-like spring on said base;

means for compressing said at least one washer-like spring into said pretensioned curvilinear cross-sectional shape along said first axis; and means associated with said shift stick for engaging said at least one washer-like spring to flex said at least one washer-like spring along said second axis orthogonal to said first axis as said shift stick is moved from a predetermined position about said first axis so as to spring bias said shift stick to return to the predetermined position.

32. A shifter for an automotive transmission comprising:

an elongate, pivotable shift stick having an upper end and a lower end, said upper end being manually actuatable and said lower end having a lever adapted for insertion in an automotive transmission for changing the drive ratio of the transmission when said shift stick is pivoted;

a base adapted for mounting said shifter on the transmission;

a spherical socket disposed on said base;

a spherical ball section disposed on said shift stick, said ball section being located between said upper end and said lever, and being received in said socket for pivotally mounting said shift stick ion said base, said lever extending through said ball section and said socket into the transmission;

a channel extending through said socket;

a rocking shaft disposed on said shift stick having first and second ends extending from said shift stick, said first and second ends extending into said channel for stabilizing said pivotable shift stick for pivotal movement about first and second orthogonal axes;

at least one washer-like spring having an aperture therein through which said lower end of said shift stick extends, said washer-like spring being normally planar when in an unstressed condition but being compressible into a curvilinear cross-sectional shape;

means for retaining said spring on said base;

means associated with said shift stick for engaging said at least one washer-like spring to flex said at least one washer-like spring as said shift stick is moved from a predetermined position so as to spring bias said shift stick to return to the predetermined position; and said means for retaining said at least one washer-like spring including means for pretensioning said at least one washer-like spring into a first curvilinear cross-sectional shape as installed when said shift stick is in said predetermined position, said at least one washer-like spring being resiliently flexible into a plurality of different curvilinear cross-sectional shapes of greater curvature when said shift stick is moved from said predetermined position.

33. A shifter for an automotive transmission comprising:

an elongate, pivotable shift stick having an upper end and a lower end, said upper end being manually actuatable and said lower end having a lever adapted for insertion in an automotive transmission for changing the drive ratio of the transmission when said shift stick is pivoted;

a base adapted for mounting said shifter on the transmission;

a spherical socket disposed on said base;

a spherical ball section disposed on said shift stick, said ball section being located between said upper end and said lever, and being received in said socket for pivotally mounting said shift stick on said base, said lever extending through said ball section and said socket into the transmission;

a channel extending through said socket;

a rocking shaft disposed on said shift stick having first and second ends extending from said shift stick, said first and second ends extending into said channel for stabilizing said pivotable shift stick for pivotal movement about first and second orthogonal axes;

at least one washer-like spring having an aperture therein through which said lower end of said shift stick extends, said washer-like spring being normally planar when in an unstressed condition but being compressible into a curvilinear cross-sectional shape;

means for retaining said spring on said base;

means associated with said shift stick for engaging said washer-like spring to flex said washer-like spring as said shift stick is moved from a predetermined position so as to spring bias said shift stick to return to the predetermined position; and said base including a molded insert, said insert forming said spherical socket and further including a curvilinear surface for receiving said at least one washer-like spring.

34. A shifter as defined in claim 33 wherein said base includes a molded cover attached to said insert, said cover including a protruding member pressing said at least one washer-like spring against said curvilinear surface to pretension said at least one washer-like spring.

35. A shifter for an automotive transmission comprising:

an elongate, pivotable shift stick having an upper end and a lower end, said upper end being manually actuatable and said lower end having a lever adapted for insertion in an automotive transmission for changing the drive ratio of the transmission when said shift stick is pivoted;

a base adapted for mounting said shifter on the transmission;

a spherical socket disposed on said base;

a spherical ball section disposed on said shift stick, said ball section being located between said upper end and said lever, and being received in said socket for pivotally mounting said shift stick on said base, said lever extending through said ball section and said socket into the transmission;

a channel extending through said socket;

a rocking shaft disposed on said shift stick having first and second ends extending from said shift stick, said first and second ends extending into said channel for stabilizing said pivotable shift stick for pivotal movement about first and second orthogonal axes;

at least one washer-like spring having an aperture therein through which said lower end of said shift stick extends, said washer-like spring being normally planar when in an unstressed condition but being compressible into a curvilinear cross-sectional shape;

means for retaining said spring on said base;

means associated with said shift stick for engaging said washer-like spring to flex said washer-like spring as said shift stick is moved from a predetermined position so as to spring bias said shift stick to return to the predetermined position; and one of said means for retaining and said means for engaging defining an off-center lien of deflection on said at least one washer-like spring so that said at least one washer-like spring provides a differential biasing force on said shift stick when said shift stick is moved.

36. A method for biasing a shift stick pivotally mounted to a base to a predetermined position on the base comprising:

providing the shifter including the base and the shift stick pivotally mounted to the base;

providing at least one flat washer-like spring that is planar when in an unstressed free-state condition;

retaining the at least one flat washer-like spring on the base in a pretensioned condition so that ht eat least one flat washer-like spring takes on a first curvilinear shape, said first curvilinear shape being arcuately-shaped when viewed in a first direction and being comprised of a plurality of linear segments extending parallel said first direction, said at least one washer-like spring being divided into opposing halves that are resiliently flexed from the planar condition;

providing a spring engaging member on the shift stick, the spring engaging member including opposing ends each positioned to engage a corresponding one of the spring halves;

engaging one of the spring halves with the corresponding spring engaging member as the shift stick is moved from the predetermined position so that the at least one washer-like spring is flexed to a second curvilinear shape of greater curvature than the first curvilinear shape, whereby the spring halves and the base generate an unbalanced force on the spring engaging member to bias the shift stick to return to the predetermined position.

* * * * *

UNITED STATES PATENT AND TRADEMARK OFFICE
CERTIFICATE OF CORRECTION

PATENT NO. : 5,313,853
DATED : May 24, 1994
INVENTOR(S) : Bruce E. Olmsted et al.

It is certified that error appears in the above-indentified patent and that said Letters Patent is hereby corrected as shown below:

Column 2, line 24;
"Washer-like" should be --washer-like--.

Column 4, line 24;
"Rooking" should be --Rocking--.

Column 11, line 1, claim 25;
"en" should be --an--.

Column 11, line 59; claim 28;
"upper nd" should be --upper end--.

Column 13, line 17, claim 32;
"ion" should be --on--.

Column 14, line 64, claim 35;
"lien" should be --line--.

Column 15, line 9, claim 36;
"ht eat" should be --the at--.

Signed and Sealed this

Seventh Day of January, 1997

Attest:

BRUCE LEHMAN

*Attesting Officer*      *Commissioner of Patents and Trademarks*